United States Patent [19]

Gill

[11] 4,229,254

[45] Oct. 21, 1980

[54] EXTENDED NIP PRESS WITH BIAS PLY REINFORCED BELT

[75] Inventor: Michael L. Gill, Beloit, Wis.

[73] Assignee: Beloit Corporation, Beloit, Wis.

[21] Appl. No.: 33,709

[22] Filed: Apr. 26, 1979

[51] Int. Cl.[3] .................... D21F 3/02

[52] U.S. Cl. .................... 162/358; 162/361

[58] Field of Search .................... 162/358, 205, 341; 428/113, 295; 100/118, 153; 74/23 R, 237, 238; 198/847; 152/DIG. 14

[56] References Cited

U.S. PATENT DOCUMENTS

| | | | |
|---|---|---|---|
| 2,112,525 | 3/1938 | Foster | 428/295 |
| 3,212,627 | 10/1965 | Beebee | 74/237 |
| 3,853,698 | 12/1974 | Mohr | 162/358 |
| 3,911,755 | 10/1975 | Vance | 74/23 R |

*Primary Examiner*—William F. Smith

*Attorney, Agent, or Firm*—Dirk J. Veneman; Michael L. Gill; Gerald A. Mathews

[57] ABSTRACT

A press section for extracting water from a continuous traveling web such as paper in which the web is sandwiched between a traveling belt and a drum. The belt is wrapped partially about the drum and a pressure shoe exerts pressure on the belt in the wrap area to press the web. The belt includes a reinforcing structure having two plies of cords extending in cross bias layers with one ply extending laterally beyond one side of the shoe area and the other ply extending laterally beyond the other side of the shoe area.

The foregoing abstract is not to be taken as limiting the invention of this application, and in order to understand the full nature and extent of the technical disclosure of this application, reference must be made to the accompanying drawings and the following detailed description.

14 Claims, 5 Drawing Figures

EXTENDED NIP PRESS WITH BIAS PLY REINFORCED BELT

BACKGROUND OF THE INVENTION

This invention relates to presses for extracting water from a continuous traveling web and particularly to such a press section for extracting water from a newly formed web of paper in a papermaking machine. More particularly it relates to an extended nip press structure and an endless belt utilized in such press structure.

While the present invention relates to dewatering of a continuously running web of any material, it will be described herein with respect to the specific process of dewatering a web of paper. In the papermaking process, the web is formed by depositing the slurry of pulp fibers on a traveling wire. A large portion of the water is normally extracted from the web in the forming area by gravity or suction. The web then passes through what is known as a press section which normally would involve a series of nips of pairs of roll couples in which a substantial amount of the remaining water is squeezed out. The web will then pass on to a drying section which normally is composed of a series of heated drums to drive water off by vaporization. The web then finally passes to such finishing operations as calendering, coating, slitting, winding, et cetera.

The present invention relates specifically to a particular type of press section wherein the pressing operation in each unit is extended in time and thereby results in the extraction of significantly more water than in the heretofore nip of a roll couple. This extended nip pressing is accomplished by wrapping an endless belt about an arc of a rotating drum. The web is sandwiched between the endless belt and the drum and may have a traveling felt on one or both sides thereof for absorbing the water from the web. Additional pressure is provided to the arc of contact area by means of a pressure shoe located on the side of the belt opposite the drum.

The principles and advantages of extended nip pressing have been discussed in U.S. Pat. Nos. 3,798,121 and 3,853,698, both of which are assigned to the assignee of this invention. These principles and advantages, therefore, need not be discussed herein. The present invention, however, is related to an extended nip press of the type disclosed in U.S. Pat. No. 3,853,698 wherein a pressure shoe located on the side of the belt opposite the drum to generate high pressing forces against the web. This is to be distinguished from the type disclosed in aforesaid U.S. Pat. No. 3,798,121 in which the pressure is provided by tension in one or more belts as they pass about the drum.

In the operation of such extended nip press sections having a pressure shoe, a problem has evolved wherein a bulge or bow forms ahead of the nip. The exact phenomenon which causes this bow or bulge is not fully understood. It is clear, however, that center portion of the endless belt in the area of the shoe is compressed, heated by the oil and friction and is otherwise worked differently than the rather wide edges of the belt. The bulge will sometimes be centered on the belt and at other times will be off to one lateral side of the belt. It will sometimes appear on the downstream side of the shoe on the laterally opposite side of the belt relative to a bulge on the upstream side of the belt. Experience thus far shows that the bulge is always confined in lateral directions to the shoe area.

Needless to say, this bulge in the belt is undesirable for many reasons, among which is the fact that it can cause wrinkling or creasing of the web. While the bulge can be eliminated by increasing the tension on the belt, this is not fully satisfactory since it causes increased loading on belts, shafts, bearings and drives. This in turn results in a decrease in the service life of such components and an increase in power consumption and down time.

The complexity of the operating conditions renders a solution to the problem evasive. Presently, pressure shoes having a 10 inch arc of contact and pressures of 600 pounds per square inch are utilized in experimental machines. This means that the belt is subjected to 6,000 pounds of normal force for every inch of width of the belt in the shoe area. Further, it is contemplated that pressures may be increased to 900 pounds per square inch or above and arcs of contact might be increased to as much as 20 inches or more. A 20 inch arc of contact and shoe pressures of 900 psi would result in 18,000 pounds of normal force for each inch of width of the belt in the shoe area.

Further, since the belt is in sliding contact with the shoe and under extremely high pressure, significant heat can be generated due to the sliding friction. The hydraulic fluid in the shoe is maintained at 140 degrees Fahrenheit (46 degrees Centigrade) to maintain the proper viscosity. With the heat caused by the sliding friction and hysteresis losses in the belt added to the heat from the oil, it is believed that belt temperatures may approach 200 degrees Fahrenheit (79 degrees Centigrade).

According to the present invention, an extended nip press section is provided in which a longitudinally extending reinforcing structure of unique design is incorporated in the belt structure. The reinforcing structure comprises a pair of plies of cords with the cords of one ply extending at a small angle with respect to longitudinal directions and the cords in the other ply extending at an equal, but opposite angle with respect to longitudinal directions. The two plies of cords overlap substantially throughout the shoe area and provide a longitudinally inextensible structure in this area.

The lateral edge of one ply extends laterally beyond one edge of the shoe substantially to the edge of the belt while the lateral edge of the other ply extends laterally beyond the other edge of the shoe substantially to the other edge of the belt. This provides support and strength to the lateral portions of the belt which do not pass between the shoe and the belt, but at the same time keeps these areas substantially free of longitudinal tension resisting structures.

Other objects, advantages and features will become more apparent with the disclosure of the principles of the invention and it will be apparent that equivalent structures and methods may be employed within the principles and scope of the invention in connection with the description of the preferred embodiment and the teaching of the principles in the specification, claims and drawings.

DESCRIPTION OF THE PREFERRED EMBODIMENT

Figure 1:
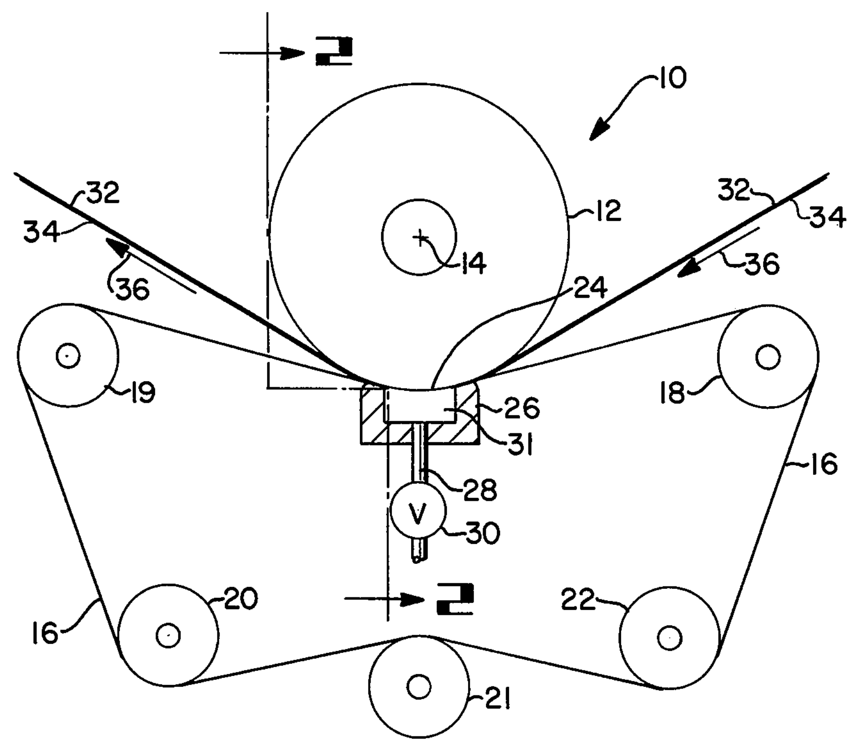
FIG. 1 is a schematic side view of a press section of a papermaking machine.

With reference to the drawing, and in particular FIG. 1, there is illustrated a schematic side elevational view of an extended nip press section 10 of a papermaking machine. The press section 10 includes a press roll 12 rotatable about an axis 14 which extends transversely of the press section. For purposes of this invention, lateral or transverse directions shall be directions which extend parallel to the rotational axis 14 of the press roll 12. Also, longitudinal or circumferential directions shall be directions which extend parallel to the direction of motion of the belt or web of paper.

A flexible endless belt 16 is trained about a plurality of pulleys 18 through 22 which are arranged in such a fashion with respect to the press roll 12 that the belt 16 wraps about a portion of the roll 12 to form an arcuate press area 24. One or more of the pulleys 18 through 22 are mounted in a known manner for movement in directions perpendicular to their respective rotational axis to permit installation of the belt 16 and adjustment of the tension in the belt 16.

An arcuate pressure shoe 26 is disposed adjacent the belt 16 on the side thereof opposite the roll 12 and press area 24. A force F is exerted on the pressure shoe by any suitable means to exert a pressure on the belt 18 in the press area. To insure even pressure P across the belt in this area, and minimize sliding friction, hydraulic pressure is supplied through a pipe 28 to a cavity 31. The pressure is regulated by means of a valve 30. The specific mechanical and hydraulic operation of the pressure shoe forms no part of the present invention and, therefore, will not be discussed herein in further detail. Further, although a pressure shoe 26 with a fluid cavity 31 is illustrated, it will be appreciated that a solid pressure shoe with an arcuate surface to mate with the roll 12 could be utilized. For a specific example of a pressure shoe, reference may be had to U.S. Pat. No. 3,853,698.

A felt 32 is trained about the press roll 12 and passes between the press roll 12 and the belt 16. A web of material 34 to be dewatered, is applied to the felt 32 and carried through the press area 24 in the direction of the arrows 36. While only one felt 32 is illustrated, it will be appreciated that a double felt system could be utilized wherein the web of paper or other similar material 34 is sandwiched therebetween.

Figure 2:
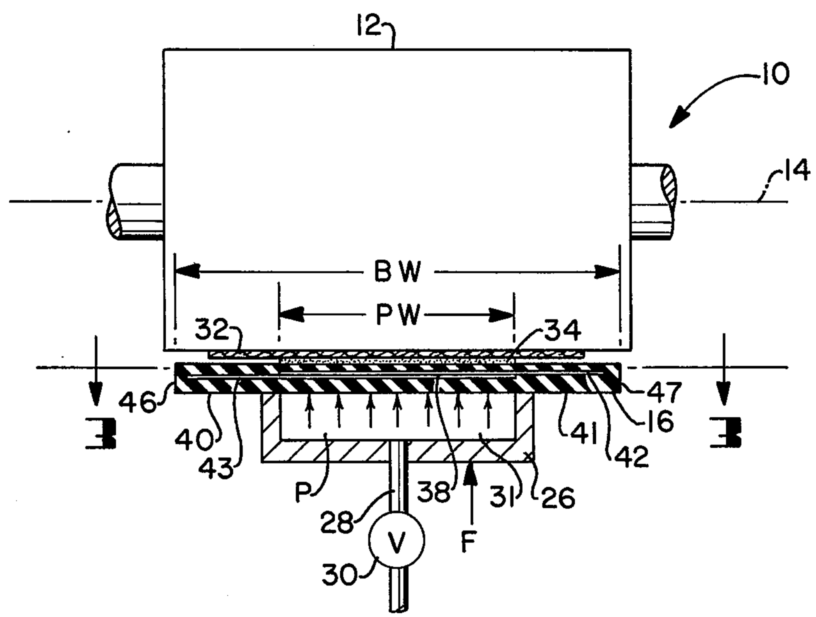
FIG. 2 is a partial cross-sectional view of the apparatus of FIG. 1 taken substantially along line 2—2 and illustrating the present invention.

As best seen in FIG. 2, the pressure shoe 26 is disposed in the transverse center area of the roll 12 and belt 16. The width PW of the pressure shoe is substantially less than the width BW of the belt and, therefore, exerts a pressure only over the center portion of the moving belt. This leaves the laterally outer portions 40,41 free of any normal force or pressure caused by the pressure shoe 26.

As discussed above, during the operation of such an extended nip press, a problem has arisen wherein a bulge or bow appears in the belt 16 on the ingoing side of the nip at various positions across the width PW of the pressure shoe. The bulge or bow can occur in a central location with respect to the shoe or at either lateral side of the shoe. Further, the bulge will sometimes appear at one lateral side of the shoe on the upstream side and at the opposite lateral side of the shoe on the downstream side. Attempts heretofore at eliminating this bulge have generally been directed to increasing the tension in the belt 16. While these attempts have successfully removed the bulge, they also result in undesirably increasing the forces and loads on the belt, bearings and drive.

In co-pending United States patent application U.S. Ser. No. 33,707 filed Apr. 26, 1979, by Dennis C. Cronin (assigned to the same assignee as this invention) it is suggested that longitudinally extending cords be provided only in the area of the belt which passes through the pressure shoe area. It is further noted in said copending application that by providing such longitudinal cords in the shoe area only, a substantial reduction in the tension required to eliminate the bulge is realized.

In accordance with the present invention, a reinforcing structure 38 is proposed for the belt 16 which will provide resistance to longitudinal tension throughout the area of the belt adjacent the shoe and at the same time permit equalizing of side to side variations in such forces. More particularly, and with reference to FIGS. 2 and 3, there is illustrated a reinforcing structure 38 which comprises a first ply 42 and a second ply 43. The first ply 42 and second ply 43 are each composed of parallel cords arranged at equal but opposite angles Alpha ($\alpha$) with respect to the longitudinal direction. Further, the first and second plies, 42 and 43, overlap each other substantially throughout the center area which passes beneath the pressure shoe 26.

The first lateral edge 44 of the first ply 42 is located substantially along the first lateral edge 48 of the shoe area. The second lateral edge 45 of the first ply 42 extends laterally beyond the second lateral edge 49 of the shoe area substantially to the second lateral edge 47 of the belt. Thus, the first ply 42 extends substantially across the second laterally outer portion 41 of the belt 16.

The first lateral edge 50 of the second ply 43 extends from the second lateral edge of the shoe area 49 across the shoe area and to the first lateral edge 46 of the belt 16. Thus, the second ply 43 extends across the first laterally outer portion 40 of the belt structure. Thus, it can be seen that the reinforcing structure 38 comprises a cross bias ply structure throughout the shoe area and single plies of fabric throughout the laterally outer portions 40 and 41.

The cord angle, Alpha, is maintained relatively low so that the combination of the low cord angle and the shear forces between the bias ply fabric layers results in a reinforcing structure in the shoe area which is substantially inextensible in longitudinal directions. Further, the cross bias plies serves to equalize longitudinal forces which may vary transversely across the shoe area. At the same time, since there is no cross ply shearing layers in the laterally outer portions 40 and 41, these areas do not have significant resistance to circumferential tension.

In order to obtain the proper modulus and strength in the longitudinal direction, it is necessary that the cord angle Alpha be relatively low in the order of about 15 and 25 degrees. In some instances, this angle could be as low as 10 degrees. The cords should be close together in each ply to resist pantographing and resultant elongation of the belt. It is further necessary that the cords in the reinforcing structure exhibit sufficient strength and modulus of elasticity to resist the tensions in the belt. The cords must also be flexible enough to withstand turning about the pulleys 18 through 22 without degradation of modulus or strength. Such suitable materials would include rayon, fiberglass, steel, aramid, or the like.

Figure 3:
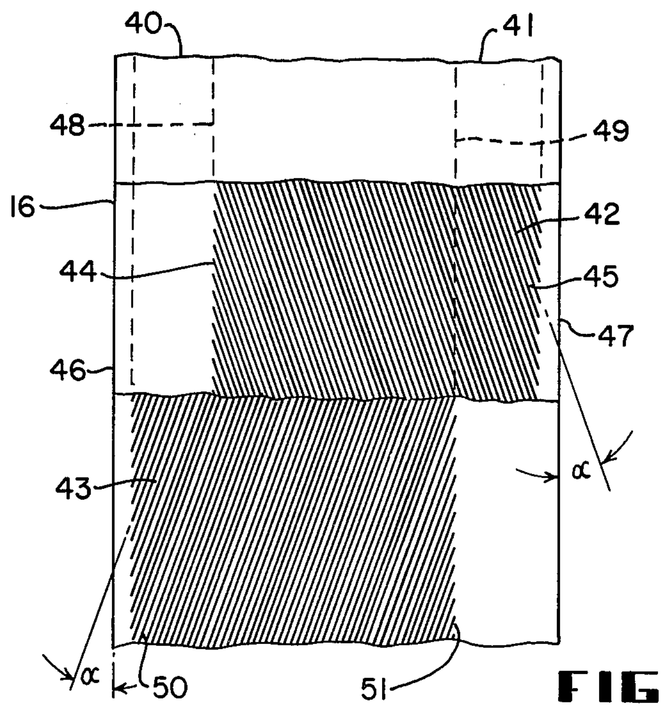
FIG. 3 is a partial sectional view of the apparatus of FIG. 1 taken substantially along line 3—3 of FIG. 2 with portions broken away to illustrate the reinforcing structure.
Figure 4:
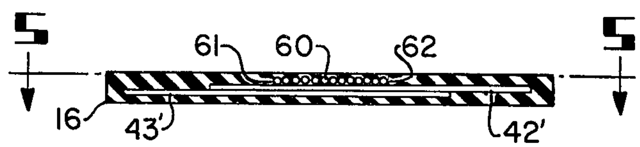
FIG. 4 is a view similar to FIG. 2 but only showing the belt to illustrate an alternate embodiment of the reinforcing structure.
Figure 5:
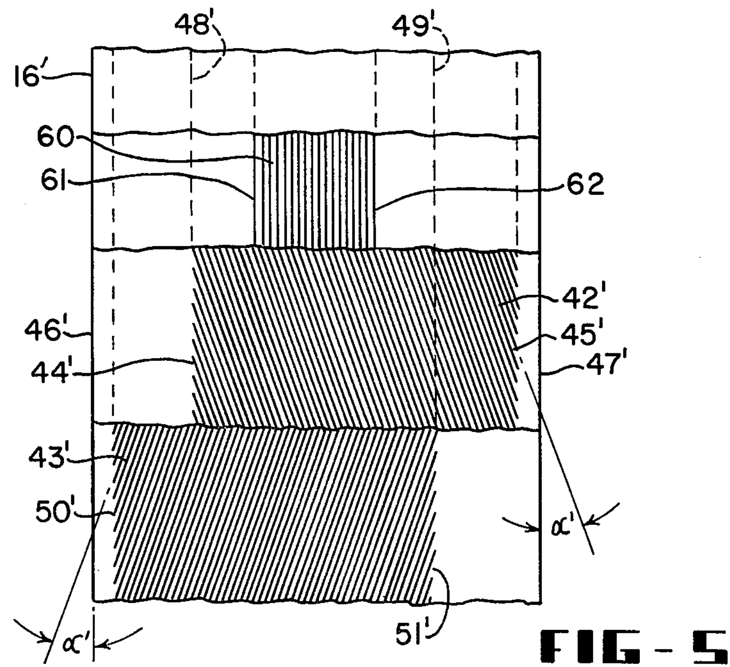
FIG. 5 is a view similar to FIG. 3 but taken along line 5—5 of FIG. 4.

In an alternate embodiment of the invention illustrated in FIGS. 4 and 5, similar portions of the belt structure to those illustrated in FIGS. 2 and 3 will have the same numbers, but will be designated as primed numbers. Specifically, a first bias ply of fabric 42' has its first lateral edge 44' disposed along the first lateral edge 48' of the shoe area, and extends laterally across belt 16' such that its second lateral edge 45' is located closely adjacent the second lateral edge 47' of the belt 16'. The second bias ply of fabric 43' has its first lateral edge 50' disposed substantially adjacent the first lateral edge 46' of the belt 16'. The second ply of fabric 43' extends across the belt structure and terminates in lateral edge 51' which lies substantially along the second lateral edge 49' of the shoe area. Both first and second bias plies 42 and 43' have their cords extending at equal, but opposite small angles Alpha ($\alpha$) with respect to longitudinal directions.

In accordance with this specific embodiment of the present invention, an additional ply of reinforcing cords 60 extends longitudinally about the belt structure and is disposed centrally within the shoe area. The width of the reinforcing structure 60 is within the range $\frac{1}{4}$ to $\frac{3}{4}$ of the width of the shoe area PW. Preferably, the width of the belt structure 60 is equal to approximately $\frac{1}{2}$ the width of the shoe area. Thus, the first and second lateral edges 61 and 62 respectively are disposed substantially inwardly with respect to the laterally outer edges 48' and 49' of the shoe area. The reinforcing structure 60 is comprised of a single layer of cords running substantially circumferentially of the belt 16 and may be provided by helically winding single cord about the belt structure in a plurality of turns. This additional ply of fabric provides added strength in the central area of the shoe where it is believed that the tensile forces are the greatest.

The elastomers used in making the belt should be carefully chosen to provide low hysteresis loss to minimize heat build up. It must be resistant to high temperatures and compatible with whatever hot oil is used in the pressure shoe as well as water and common chemicals used in paper machines. Further, it should have good abrasion resistance and a low coefficient of friction since it will be subjected to sliding friction as it passes over the shoe. Suggested elastomers include acrylonitrile butadienes, ethylene acrylic copolymers, polyurethanes, fluorinated hydrocarbons and epichlorohydrin rubbers.

While a certain representative embodiment and details have been shown for the purpose of illustrating the invention, it will be apparent to those skilled in this art that various changes and modifications may be made therein without departing from the spirit or scope of the invention.

What is claimed is:

1. An extended nip press for removing water from a moving web of material, said press comprising:

a rotatable roll having a cylindrical outer pressing surface;

a flexible endless belt trained about a plurality of pulleys such that said belt turns about the pressing surface of said roll over an arc of contact;

at least one movable felt means trained about said roll between said belt and said roll for carrying said web of material between said belt and said roll;

a pressure shoe disposed on the side of said belt opposite said roll and adjacent said arc of contact, said shoe terminating in lateral directions substantially short of the lateral edges of said belt; and a reinforcing structure in said belt extending circumferentially thereof, said reinforcing structure comprising a first ply of parallel cord fabric having its cords extending at a first angle no greater than 25° with respect to the longitudinal direction and a second ply of parallel cord fabric having is cords extending at a second angle equal in magnitude but opposite in direction with respect to the longitudinal direction, said first ply and said second ply forming an overlapped portion which is limited in lateral directions substantially to the area of said shoe so that the portions of said belt laterally outside the area of said shoe are free of cross ply shearing layers and said belt is substantially free of any bulging adjacent said shoe.

2. An extended nip press as claimed in claim 1 wherein said first angle is between 10° and 25°.

3. An extended nip press as claimed in claim 2 wherein said first angle is about 15°.

4. An extended nip press as claimed in claim 1 wherein one lateral edge of said first ply extends laterally outwardly to one edge of the belt and a lateral edge of said second ply extends laterally outwardly to the other edge of said belt.

5. An extended nip press as claimed in claim 1 wherein said overlap portion extends laterally substantially throughout the width of said shoe.

6. An extended nip press as claimed in claim 1 further including a single layer of 0° cords extending circumferentially about the belt, said layer extending laterally over the central $\frac{1}{4}$ to $\frac{3}{4}$ of said shoe area.

7. An extended nip press as claimed in claim 6 wherein said 0° cords extend over the central $\frac{1}{2}$ of said shoe area.

8. In a press of the type for removing water from a moving web of material and including a rotatable press roll, a flexible endless belt trained about an arc of said roll and an arcuate pressure shoe adjacent said roll, said shoe terminating in lateral directions substantially short of the lateral edges of said belt, the improvement comprising:

a reinforcing structure in said belt extending circumferentially thereof, said reinforcing structure comprising a first ply of parallel cord fabric having its cords extending at a first angle no greater than 25° with respect to the longitudinal direction and a second ply of parallel cord fabric having its cords extending at a second angle equal in magnitude but opposite in direction with respect to the longitudinal direction, said first ply and said second ply forming an overlapped portion which is limited in lateral directions substantially to the area of said shoe so that the portions of said belt laterally outside the area of said shoe are free of cross ply shearing layers and said belt is substantially free of any bulging adjacent said shoe.

9. The improvement as claimed in claim 8 wherein said first angle is between 10° and 25°.

10. An extended nip press as claimed in claim 9 wherein said first angle is about 15°.

11. The improvement as claimed in claim 8 wherein one lateral edge of said first ply extends laterally outwardly to one edge of the belt and a lateral edge of said second ply extends laterally outwardly to the other edge of said belt.

12. The improvement as claimed in claim 8 wherein said overlap portion extends laterally substantially throughout the width of said shoe.

13. The improvement as claimed in claim 8 further including a single layer of 0° cords extending circumferentially about the belt, said layer extending laterally over the central ¼ to ¾ of said shoe area.

14. The improvement as claimed in claim 13 wherein said 0° cords extend over the central ½ of said shoe area.

* * * * *